US007215396B2

(12) United States Patent
Hong et al.

(10) Patent No.: US 7,215,396 B2
(45) Date of Patent: May 8, 2007

(54) MULTI-DOMAIN LIQUID CRYSTAL DISPLAY HAVING SPACER ALIGNED WITH ALIGNMENT BOUNDARY

(75) Inventors: Hyung Ki Hong, Seoul (KR); Gi-Hong Kim, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/207,062

(22) Filed: Jul. 30, 2002

(65) Prior Publication Data
US 2003/0030769 A1  Feb. 13, 2003

(30) Foreign Application Priority Data
Aug. 10, 2001  (KR)  ................. 2001-48256

(51) Int. Cl.
*G02F 1/1337* (2006.01)
*G02F 1/1339* (2006.01)
(52) U.S. Cl. ................... 349/129; 349/155; 349/156
(58) Field of Classification Search ................. 349/129, 349/155, 156
See application file for complete search history.

(56) References Cited
U.S. PATENT DOCUMENTS 5,801,802 A * 9/1998 Inoue et al. ................ 349/129
5,831,710 A * 11/1998 Colgan et al. ............... 349/156
6,067,140 A * 5/2000 Woo et al. ................... 349/129
6,184,961 B1 * 2/2001 Ham ........................... 349/141
6,356,335 B1 * 3/2002 Kim et al. ................... 349/156
6,437,845 B1 * 8/2002 Yamada et al. .............. 349/129
6,445,437 B1 * 9/2002 Miyazaki et al. ............ 349/156
6,493,050 B1 * 12/2002 Lien et al. ................... 349/106
6,512,569 B1 * 1/2003 Acosta et al. ............... 349/181
6,593,987 B1 * 7/2003 Walton et al. ............... 349/129

FOREIGN PATENT DOCUMENTS
KR     2000031955 A  *  6/2000

* cited by examiner

*Primary Examiner*—Andrew Schechter
*Assistant Examiner*—Michael H. Caley
(74) *Attorney, Agent, or Firm*—McKenna Long & Aldridge LLP

(57) ABSTRACT

Disclosed is a multi-domain liquid display preventing deviation of a domain boundary using a patterned spacer. The present invention includes a first substrate having a plurality of pixel areas defined by a plurality of data and gate lines and a plurality of pixel electrodes formed in the pixel areas, respectively, a second substrate having a black matrix layer cutting of lights from a portion excluding the pixel areas and an alignment boundary and a color filter layer realizing colors, a first alignment layer formed on the first or second substrate so as to have at least two different alignment states centering around the alignment boundary in each of the pixel areas, and a patterned spacer formed between the first and second substrates at a portion of the alignment boundary.

21 Claims, 8 Drawing Sheets

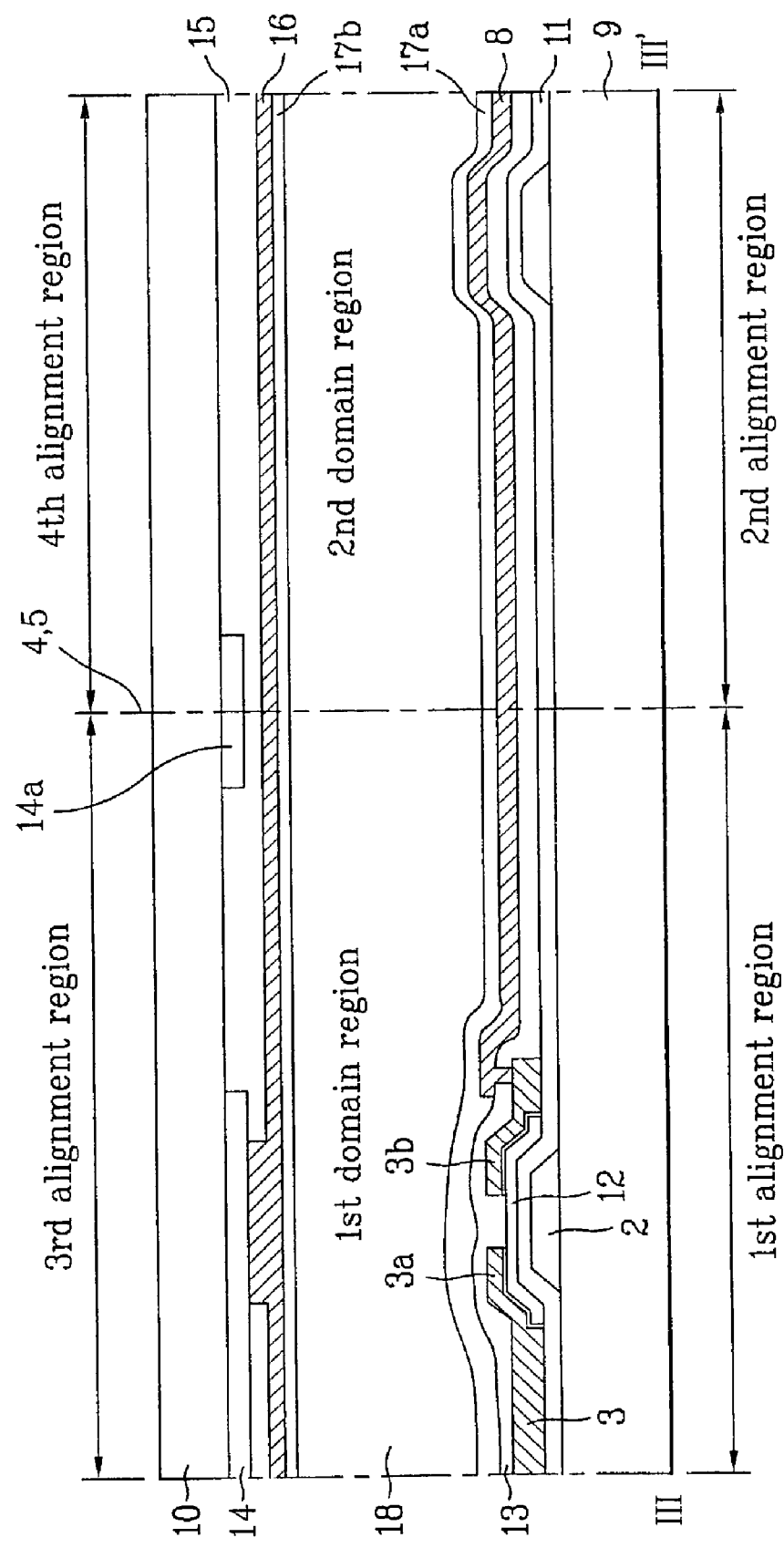

MULTI-DOMAIN LIQUID CRYSTAL DISPLAY HAVING SPACER ALIGNED WITH ALIGNMENT BOUNDARY

This application claims the benefit of the Korean Application No. 2001-048256 filed on Aug. 10, 2001, which is hereby incorporated by reference for all purposes as if fully set forth herein.

BACKGROUND OF THE INVENTION

1. Field of the Invention

The present invention relates to a liquid crystal display, and more particularly, to a multi-domain liquid crystal display preventing deviation of a domain boundary using a patterned spacer.

2. Discussion of the Related Art

A liquid crystal panel as a main element of a liquid crystal display includes a first substrate having color filters and a common electrode formed thereon, a second substrate having a TFT array and pixel electrodes formed thereon so as to leave an interval from the first substrate, and liquid crystals injected between the first and second substrates. In this case, alignment layers are formed between the first substrate and liquid crystals and between the second substrate and liquid crystals, respectively so as to anchor uniformly the liquid crystals adjacent to surfaces of the alignment layers thereto. When the liquid crystals adjacent to the first and second substrates are uniformly anchored in a predetermined direction, distribution of the liquid crystal molecules constitutes a structure of a liquid crystal layer having the most stable state by elasticity of the liquid crystal molecules. In other words, the structure of the liquid crystal layer depends on the alignment characteristics of the alignment layers of the first and second substrates. In this case, each alignment characteristic of the respective substrates can be expressed by an alignment direction and a pretilt angle of the corresponding alignment layer.

An alignment process method for the alignment layer formed on the substrate is mainly a rubbing method. The rubbing method applies a mechanical force to the alignment layer formed on the substrate in a predetermined direction using a cloth, thereby enabling to perform an alignment process simply and quickly.

Even though being useful for giving a single alignment direction to the alignment layer on the substrate, the rubbing method has difficulty in carrying out the alignment process on the single alignment layer on the substrate to have various alignment directions.

Each of the alignment layers on the first and second substrates is made to have one alignment direction, the first and second substrates are bonded to each other so that the alignment layers confront each other, and liquid crystals are injected between the first and second substrates. Thus, a uniform mono-domain liquid crystal panels is prepared. In this case, in accordance with the arrangement of the alignment directions of the first and second substrates, the liquid crystal layer has a twist structure or parallel configuration. Yet, the mono-domain liquid crystal panel has an asymmetrical characteristic of a viewing angle as well as an area having a bad photo characteristic. Namely, an area having gray inversion or bad contrast ratio is generated in accordance with the viewing angle.

Therefore, in order to improve the viewing angle characteristics of the liquid crystal panel, proposed are multi-domain liquid crystal panels such as TDTN (two domains TN)-LCD and the like. The multi-domain liquid crystal panel is fabricated by carrying out an alignment process thereon so as to provide at least two different alignment directions of alignment layers on two confronting substrates.

A general multi-domain liquid crystal and fabricating method thereof according to a related art are explained in detail by referring to the attached drawings as follows.

FIG. 1A illustrates a layout of a liquid crystal display according to a related art, and FIG. 1B illustrates a cross-sectional view along a cutting line I–I' in FIG. 1A.

Referring to FIG. 1A and FIG. 1B, a general multi-domain liquid crystal display includes a plurality of gate lines 1 formed on a first substrate 9 in one direction so as to leave a predetermined interval from each other and a plurality of data lines formed in a direction vertical to the gate lines 1 respectively so as to define a plurality of pixel areas. A plurality of pixel electrodes 8 are formed on the pixel areas, respectively, and a plurality of thin film transistors (TFT) 7 are formed on intersections where the gate and data lines 1 and 3 cross with each other so as to apply data signals of the data lines 3 to the pixel electrodes 8 in accordance with scan signals of the gate lines 1, respectively. And, a first alignment layer 17a is formed on an entire surface of the first substrate including the pixel electrodes 8.

A black matrix layer 14 is formed on a second substrate 10 so as to cut off lights from a portion except the pixel areas, and R, G, and B color filter layers 15 are formed on portions corresponding to the respective pixel areas so as to realize colors. A common electrode 16 is formed on entire surfaces of the R, G, and B color filter layers 15, and a second alignment layer 17b is formed on the common electrode 16.

The above-constituted first and second substrates 9 and 10 secure a predetermined space by a ball spacer 6 so as to be bonded to each other by a sealant (not shown in the drawings).

A liquid crystal layer 18 is formed in a space between the bonded two substrates.

As mentioned in detail in the foregoing explanation, in a case of the mono-domain liquid crystal panel of which alignment states of the first and second alignment layers are uniform, there are problems such as the asymmetric viewing angle characteristic, the area having gray inversion according to the viewing angle, the reduced contrast ratio, and the like. Hence, it is necessary to fabricate a multi-domain liquid crystal panel having different alignment states in an area divided into at least two sub-areas in the same cell.

In order to fabricate the multi-domain liquid crystal panel, as shown in FIG. 1A and FIG. 1B, the pixel area on the first substrate 9 is divided into first and second alignment areas so that the first alignment layer 17a has different alignment states, and the other pixel area on the second substrate 10 is divided into third and fourth alignment areas so that the second alignment layer 17b has different alignment states. Namely, a first domain area is determined by the first alignment are of the first alignment layers 17a and the third alignment area of the second alignment layer 17b, and a second domain area is determined by the second alignment area of the first alignment layer 17a and the fourth alignment area of the second alignment layer 17b.

An alignment method for the first to fourth alignment areas is explained by referring to the attached drawings as follows.

FIG. 2A and FIG. 2B illustrates cross-sectional views along a cutting line II–II' in FIG. 1A for explaining an alignment method of a general multi-domain liquid crystal display, and FIG. 3 illustrates a schematic cross-sectional view along the cutting line II–II' in FIG. 1A.

For a method of forming alignment layers, an alignment material such as polyimide is coated on the first substrate 9 having finished TFT array and pixel electrode processes and the second substrate 10 on which the common electrode is formed, thereby forming the first and second alignment layers 17a and 17b. The first and second alignment layers 17a and 17b, as shown in FIG. 2A, are then rubbed for first alignment.

Referring to FIG. 2B, a photo-mask 20 is selectively formed on portions of the first and second alignment layers 17a and 17b of the first and second substrates 9 and 10 corresponding to the second and third alignment areas in FIG. 1B. UV-rays are irradiated on the first and fourth alignment areas selectively so as to reduce pretilt angles of the first and second alignment layers 17a and 17b.

After completion of the alignment process, a ball spacer 6 is scattered on the first or second substrate 9 or 10. A sealant (not shown in the drawing) is printed on the first or second substrate 9 or 10 so as to bon the first and second substrates to each other. Liquid crystals are then injected between the first and second substrates.

Namely, alignment areas having greater pretilt angles in domains alternate with each other, whereby directions of mean liquid crystal molecules are distributed so as to be opposite to each other. When an electric field is applied thereto, as shown in FIG. 3, main viewing angle directions of two domains become opposite to each other so as to compensate the viewing angle thereof.

In this case, if a boundary between the areas having the alignment states different from each other is called an alignment boundary 4, the alignment directions of the mean liquid crystal molecules should be different from each other centering around the alignment boundary 4 in the above-constituted multi-domain liquid crystal display. Since the alignment directions of the mean liquid crystal molecules are different from each other centering around the alignment boundary, light leakage may be generated from a portion corresponding to the alignment boundary 4. In order to prevent the light leakage of the alignment boundary 4, the black matrix layer 14a is formed on the second substrate 10 corresponding to the alignment boundary 4.

Yet, referring to FIG. 1A and FIG. 1B, the alignment directions of the mean liquid crystal molecules fail to differ in directions from each other at the alignment boundary 4, but the first domain area crosses the alignment boundary 4 so as to expand to a portion A adjacent to the alignment boundary 4.

Therefore, a boundary from which the real alignment directions of liquid crystals becomes a real domain boundary 5 failing to coincide with the alignment boundary 4.

When the alignment boundary 4 fails to coincide with the real domain boundary 5, the black matrix layer 14a for preventing the light leakage of the alignment boundary 4 fails to prevent light leakage from the real domain boundary (disclination line) 5.

Since the light leakage from the real domain boundary 5 fails to be prevented, a contrast ratio is decreased. Moreover, an opening ratio is reduced if the black matrix layer 14a is formed wider to consider the above problem.

Thus, the major factor of generating the mismatch between the alignment boundary 4 and the real domain boundary 5 is the ball spacer 6 formed at the portion adjacent to the alignment boundary 4.

In this case, the ball spacer 6 is formed in a manner that plastic or silica balls, each having a demanded size, are scattered on a substrate. Spacer balls are dispersed in an organic solvent, and then the spacer 6 and organic solvent adhere to the surface of the substrate using an air pressure. Flon was previously used as the organic solvent, but is restricted or ceases to use for the protection of global environment. Therefore, replacement solvents and dry scattering methods are developed so as not to use the organic solvent. And, uniformity improvement of the spacer 6 in distribution density, bonding prevention, enhancement of adhesiveness between upper and lower plates as well as large-sized product and high resolution become current issues for LCD fabrication.

Besides, a panel of which pixel pitch is 20~30 μm like a liquid crystal projector uses a black resin spacer 6 since a contrast ratio is reduced by light leakage at a portion where the spacer 6 exists.

As mentioned in the above explanation, the spacer 6 is scattered so as to maintain a uniform gap (height) between upper and lower plates of LCD according to the related art. The scattered spacer 6 fails to precisely coincide with the alignment boundary 4 in the multi-domain LCD. Therefore, the director of the liquid crystals is influenced by the spacer 6 so that the domain boundary 5 fails to coincide with the alignment boundary 4.

Namely, in case of using the first and second alignment layers 17a and 17b fabricated by the above method, the alignment boundary 4 should coincide with the domain boundary 5 at the pixel electrode. Yet, as shown in FIG. 1A and FIG. 1B, the alignment boundary 4 deviates from the domain boundary 5 so that the domain boundary 5 is formed around the spacer 6. When the general spacer 6 is scattered on the first or second substrate 9 or 10, the domain boundary 5 fails to coincide with the alignment boundary 4 as well as is formed around the spacer 6. Therefore, the contrast ratio of the pixel is reduced. This means that the domain boundary is misaligned since the randomly scattered spacer 6 has influence on the alignment boundary 4. In order to overcome this misalignment of the domain boundary, required is a spacer arranged regularly as well as enabling to minimize the influence on the pixel electrode.

SUMMARY OF THE INVENTION

Accordingly, the present invention is directed to a multi-domain liquid crystal display that substantially obviates one or more problems due to limitations and disadvantages of the related art.

An object of the present invention is to provide a multi-domain liquid crystal display having a domain boundary coincide with an alignment boundary by forming a patterned spacer at a portion corresponding to the alignment boundary.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multi-domain liquid crystal display according to the present invention includes a first substrate having a plurality of pixel areas defined by a plurality of data and gate lines and a plurality of pixel electrodes formed in the pixel areas, respectively, a second substrate having a black matrix layer cutting of lights from a portion excluding the pixel areas and an alignment boundary and a color filter layer realizing colors, a first alignment layer formed on the first or second substrate so as to have at least two different alignment states centering around the alignment boundary in each of the pixel areas, and a patterned spacer formed between the first and second substrates at a portion of the alignment boundary.

Preferably, the multi-domain liquid crystal display further includes a second alignment layer formed on the first or second substrate failing to have the first alignment layer.

More preferably, the second alignment layer has a mono-domain.

More preferably, the second alignment layer has at least tow different alignment states centering around the alignment boundary.

More preferably, the first and second alignment layers are aligned in directions vertical to each other and the second alignment layer is aligned in a direction parallel with the data lines.

More preferably, the first and second alignment layers are aligned in directions vertical to each other and the second alignment layer is aligned in a direction inclining to the gate lines at 45°.

More preferably, the first and second alignment layers are exposed to UV-rays selectively so as to have a plurality of pretilt angles in each of the pixel areas.

Preferably, the patterned spacer is formed on an intersection between the alignment boundary and data line.

Preferably, the patterned spacer is formed on the black matrix layer of the second substrate corresponding to an intersection between the alignment boundary and data line.

Preferably, the patterned spacer is formed of an insulator selected from a group consisting of PR (photoresist), BCB (benzocyclobutene), and $SiN_x$.

Preferably, the multi-domain liquid crystal display further includes a common electrode formed on the color filter layer.

More preferably, the patterned spacer is formed on the common electrode of the second substrate corresponding to an intersection between the alignment boundary and data line.

Preferably, the alignment boundary traverses centers of the respective pixel areas so as to be in parallel with the gate lines.

Preferably, the alignment boundary is bent at a center of each of the pixel areas.

In another aspect of the present invention, a multi-domain liquid crystal display includes a first substrate having a plurality of pixel areas defined by a plurality of data and gate lines and a plurality of pixel electrodes formed in the pixel areas, respectively, a second substrate having a black matrix layer cutting of lights from a portion excluding the pixel areas and an alignment boundary and a color filter layer realizing colors, a liquid crystal layer formed between the first and second substrates so as to have at least one alignment boundary in each of the pixel areas, and a patterned spacer formed between the first and second substrates at a portion of the alignment boundary.

Preferably, the patterned spacer is formed on an intersection between the alignment boundary and data line.

Preferably, the patterned spacer is formed on the black matrix layer of the second substrate corresponding to an intersection between the alignment boundary and data line.

Preferably, the patterned spacer is formed of an insulator selected from a group consisting of PR (photoresist), BCB (benzocyclobutene), and $SiN_x$.

Preferably, the alignment boundary traverses centers of the respective pixel areas so as to be in parallel with the gate lines.

Preferably, the alignment boundary is bent at a center of each of the pixel areas.

The present invention is characterized in that the patterned spacer formed at the alignment boundary, from which each pretilt angle differs, helps to confirm a domain boundary as well as the alignment boundary coincides with the domain boundary so as not to twist liquid crystals to the contrary.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5A illustrates a cross-sectional view along a cutting line III–III' in FIG. 4;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
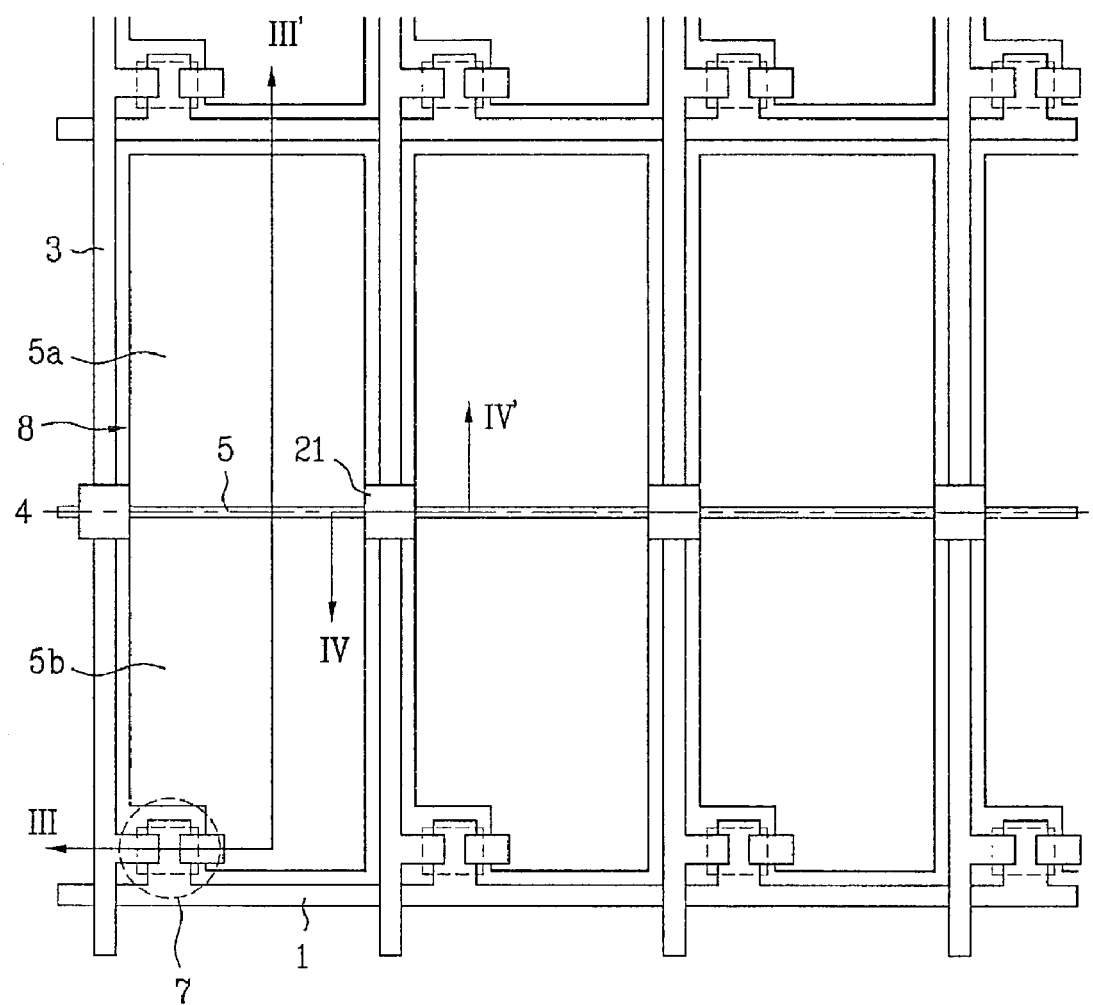
FIG. 4 illustrates a layout of a multi-domain liquid crystal display according to a first embodiment of the present invention.
Figure 5B:
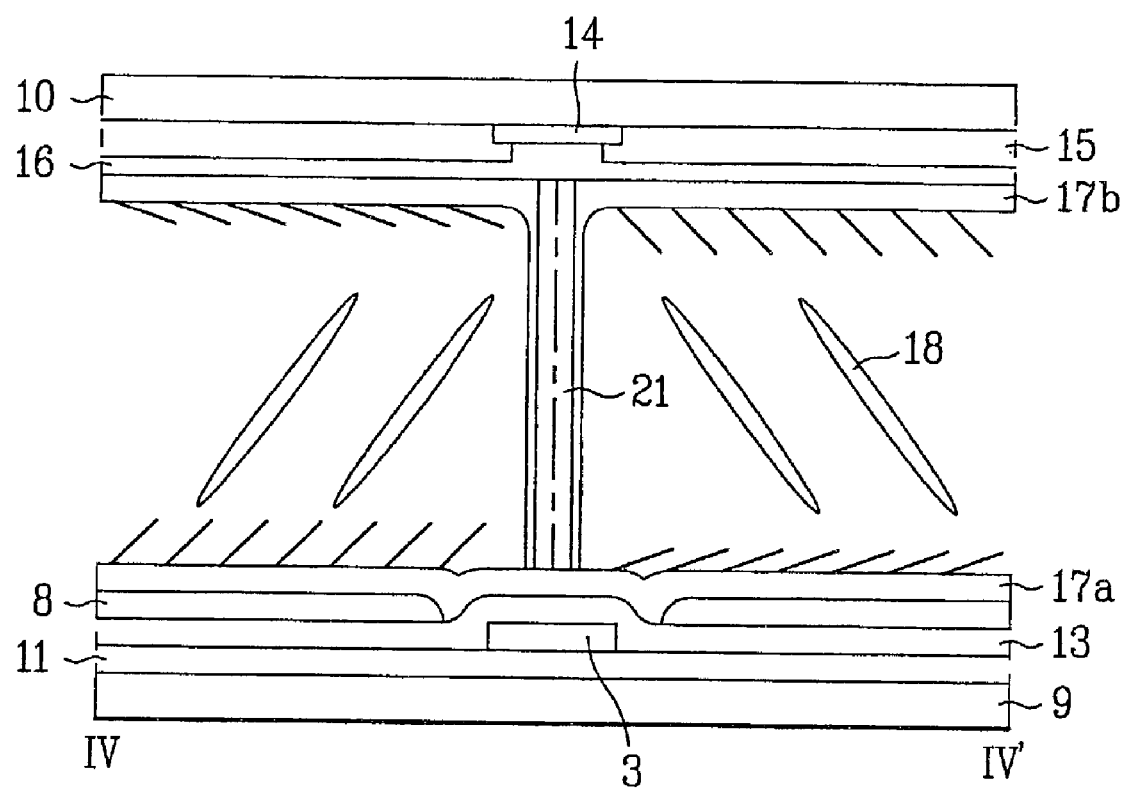
FIG. 5B illustrates a cross-sectional view along a cutting line IV–IV' in FIG. 4.

FIG. 4 illustrates a layout of a multi-domain liquid crystal display according to a first embodiment of the present invention, FIG. 5A illustrates a cross-sectional view along a cutting line III–III' in FIG. 4, and FIG. 5B illustrates a cross-sectional view along a cutting line IV–IV' in FIG. 4.

Referring to FIG. 4, FIG. 5A, and FIG. 5B, a multi-domain liquid crystal display according to the present invention includes a plurality of gate lines 1 formed in one direction on a first substrate 9 so as to leave a predetermined interval from each other and a plurality of data lines 3 formed in a direction vertical to each of the gate lines 1 so as to define a plurality of pixel areas. A plurality of pixel electrodes 8 are formed on the pixel areas, respectively. A plurality of thin film transistors 7 are formed at portions where the gate and data lines 1 and 3 cross with each other so as to apply data singles of the data lines 3 to the pixel electrodes 8 in accordance with scan signals of the gate lines 1, respectively. And, a first alignment layer 17a is formed on an entire surface of the first substrate 9 including the pixel electrodes 8.

Black matrix layers 14 and 14a are formed on a second substrate 10 so as to cut off lights from an alignment boundary portion and a portion excluding the pixel areas. An R/G/B color filter layer 15 is formed on portions corresponding to the pixel areas so as to realize colors. A common electrode 16 is formed on an entire surface of the color filter layer 15, and a second alignment layer 17b is formed on the common electrode 16.

The alignment layers 17a and 17b have different directional orientations centering around an alignment boundary 4, respectively. A patterned spacer 21 is formed at an intersection between the alignment boundary 4 and the data line 3 of the first substrate 9 so as to meet a corresponding part of the second substrate 10. And, first and second domains realized by the first and second alignment layers are formed centering around the alignment boundary including the patterned spacer 21.

A process of fabricating the above-constituted multi-domain liquid crystal display according to the present invention is explained in the following description.

Processes of forming the first/second substrates 9/10 and a TFT array are similar to those of semiconductor fabrication so as to include unit processes of thin film deposition, photolithography, etching, and the like.

Referring to FIG. 5A, a gate line 1 and a gate electrode 2 are formed on a first substrate 9, and an insulating layer 11 is formed so as to isolating the gate line 1 and gate electrode 2. A semiconductor layer 12 is formed on a gate insulating layer 11 over the gate electrode 2 so as to have an island shape. A data line 3 is formed in a direction vertical to the gate line 1, and simultaneously, source and drain electrodes 3a and 3b are formed on both sides of the semiconductor layer 12 so as to protrude from the data line 3 to form a thin film transistor 7. A passivation layer 13 is formed on the entire substrate, a contact hole is formed on the drain electrode 3b, and then a pixel electrode (ITO) 8 is formed on each pixel area so as to be connected to the drain electrode 3b through the contact hole.

As a final process for the first substrate 9, a first alignment layer 17a is formed on an entire surface of the substrate.

Meanwhile, black matrix layers 14 and 14a are formed on a second substrate 10 corresponding to the gate line 1, data line 3, and thin film transistor 7 on the first substrate and the alignment boundary 4 or domain boundary 5 so as to cut off light leakage therefrom. A color filter layer 15 constructed with R, G, and B cells is formed at a portion corresponding to the pixel area between the black matrix layers 14. In this case, an overcoating layer may further be formed for planarization using spin coating. A common electrode 16 is formed on the color filter layer 15 by sputtering so as to induce a voltage difference of the pixel area driven by the thin film transistor 7 of the first substrate 9.

A patterned spacer 21 is then formed on the common electrode 16 corresponding to an intersection between the alignment boundary 4 and data line 3 of the first substrate 9 using an organic insulator such as PR (photoresist) and BCB (benzocyclobutene) or inorganic insulator such as $SiN_x$.

Finally, a second alignment layer 17b is formed on an entire surface of the second substrate like the first substrate 9. In this case, the patterned spacer 21 may be formed on either the first or second substrate 9 or 10, but is usually formed on the second substrate 10 with ease. Therefore, the patterned spacer 21 may be formed after formation of the black matrix layers 14 and 14a or common electrode 16.

Figure 2A:
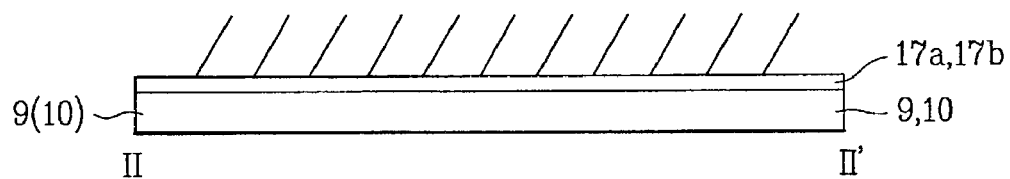
FIG. 2A and FIG. 2B illustrate cross-sectional views along a cutting line II–II' in FIG. 1A.
Figure 2B:
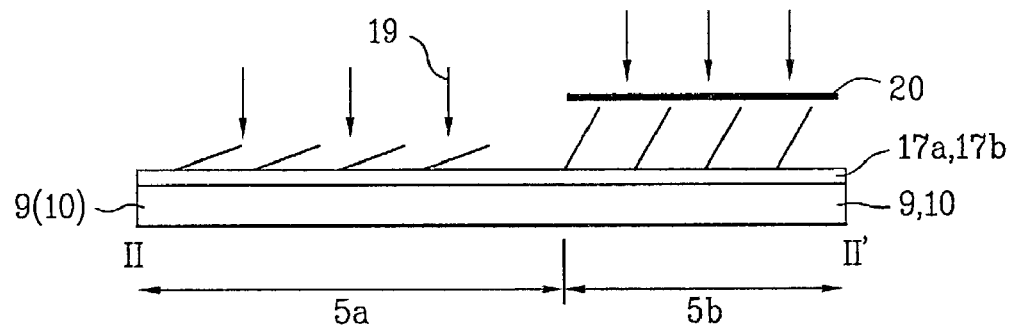
Figure 3:
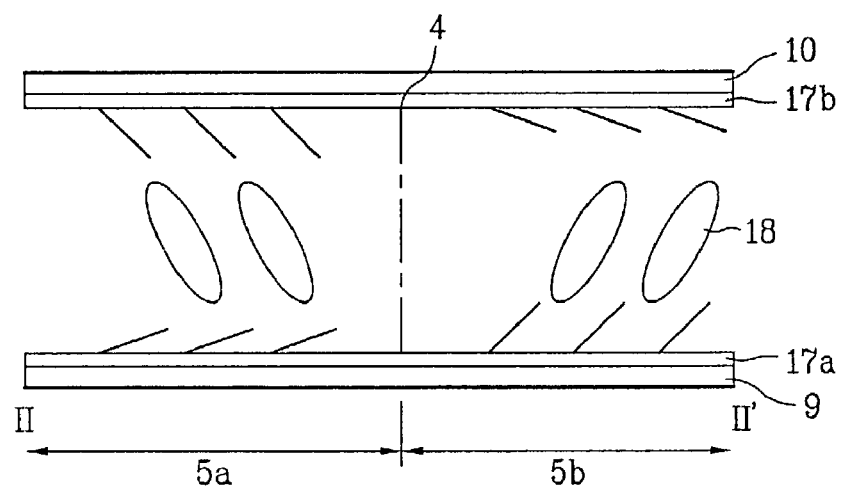
FIG. 3 illustrates a schematic cross-sectional view along the cutting line II–II' in FIG. 1A.

In this case, alignment directions to form multi-domains on the first and second alignment layers 17a and 17b are made by the same method of the related art explained in FIG. 2A and FIG. 2B.

Namely, the first and second alignment layers 17a and 17b are rubbed for first alignment as did in FIG. 2A.

Figure 1A:
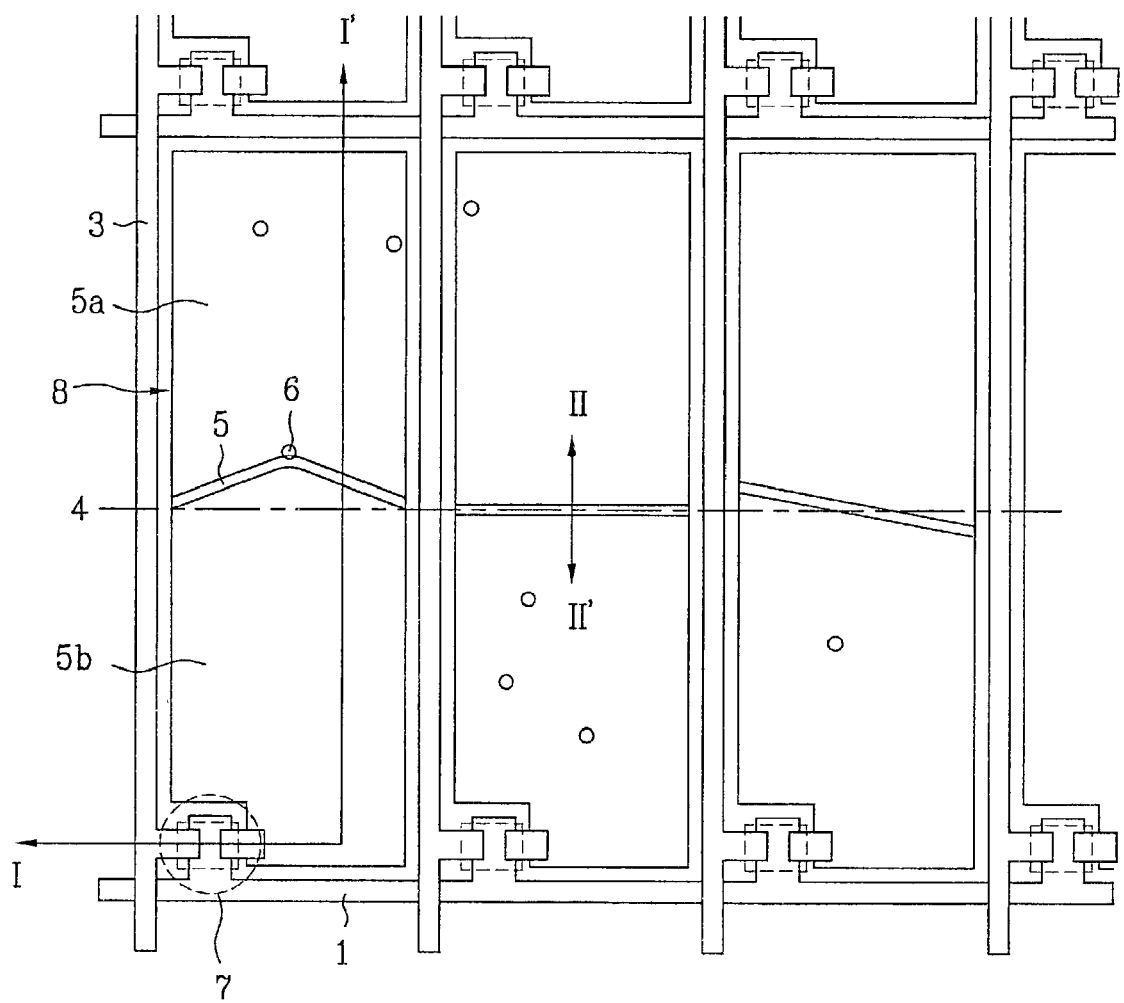
FIG. 1A illustrates a layout of a liquid crystal display according to a related art.
Figure 1B:
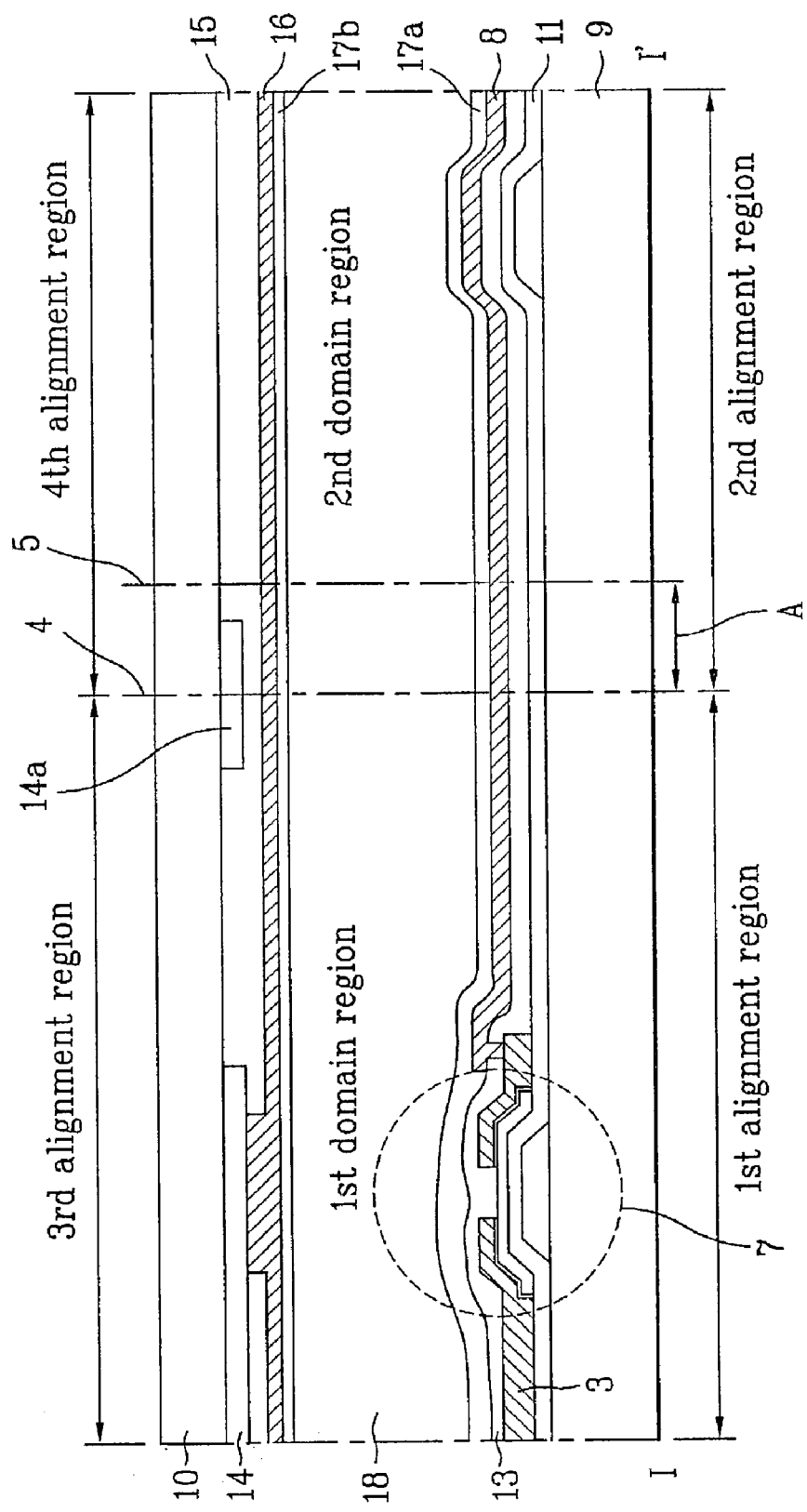
FIG. 1B illustrates a cross-sectional view of the liquid crystal display bisected along a cutting line I–I' in FIG. 1A.

Photomasks 20 are selectively formed on portions of the first and second alignment layers 17a and 17b of the first and second substrates 9 and 10 so as to correspond to the second and third alignment areas in FIG. 1B, respectively. And, UV-rays are irradiated on the first and fourth alignment areas selectively so as to reduce pretilt angles of the first and second alignment layers 17a and 17b.

In this case, if one alignment process is carried out on the first alignment layer 17a in a direction in parallel with the gate line, the other alignment process is carried out on the second alignment layer 17b in a direction in parallel with the data line. It is a mater of course that alignment processes can be carried out at 45° as well as 135°. The alignment method for forming multi-domains is carried out by making the pretilt angles be different from each other in the drawing. But, the alignment method can be carried out by making different alignment directions or the like.

Moreover, the above explanation relates to the method of forming multi-domains on both of the first and second alignment layers 17a and 17b. Instead, it is also possible that a multi-domain is formed one of the first and second alignment layers 17a and 17b and a mono-domain is formed on the other.

FIG. 5B illustrates a cross-sectional view along a cutting line IV–IV' in FIG. 4.

Referring to FIG. 5B, the patterned spacer 21 is formed between a portion of the first substrate corresponding to the alignment boundary 4 and a confronting face of the second substrate corresponding to the alignment boundary 4. The liquid crystals are aligned at both sides of the first and second substrates 9 and 10 centering around the patterned spacer 21 by the alignment layers having the different pretilt angles. In this case, the patterned spacer 21 plays a role in maintaining a cell gap when the first and second substrates 9 and 10 are bonded to each other and another role in conforming that the domain boundary 5 coincides with the alignment boundary 4.

Therefore, the patterned spacer 21 according to the present invention enables to settle the problems that the scattered ball spacer of the related art fails to coincide with the alignment boundary to have influence on the director of liquid crystals and that the alignment boundary 4 fails to coincide precisely with the domain boundary 5.

Besides, light leakage may occur at the domain boundary 5 from which the directors of the liquid crystals 18 start to differ from each other. In order to overcome this light leakage, the black matrix layer 14a is formed to have a predetermined width on the second substrate corresponding to the alignment boundary 4. The width of the black matrix is 5~20 μm in general. On the other hand, the patterned spacer 21, as mentioned in the foregoing description, is formed at the alignment boundary 4 in the present invention, thereby enhancing the possibility that the alignment boundary 4 coincides with the domain boundary 5. Therefore, the present invention enables to reduce the width of the black matrix layer 14a, which is formed to cut off light from the alignment boundary 4 so as to be narrower than that of the related art.

However, a rubbed mark caused by the patterned spacer 21 may appear in accordance with the alignment direction when the patterned spacer 21 according to the present invention is used.

Figure 6:
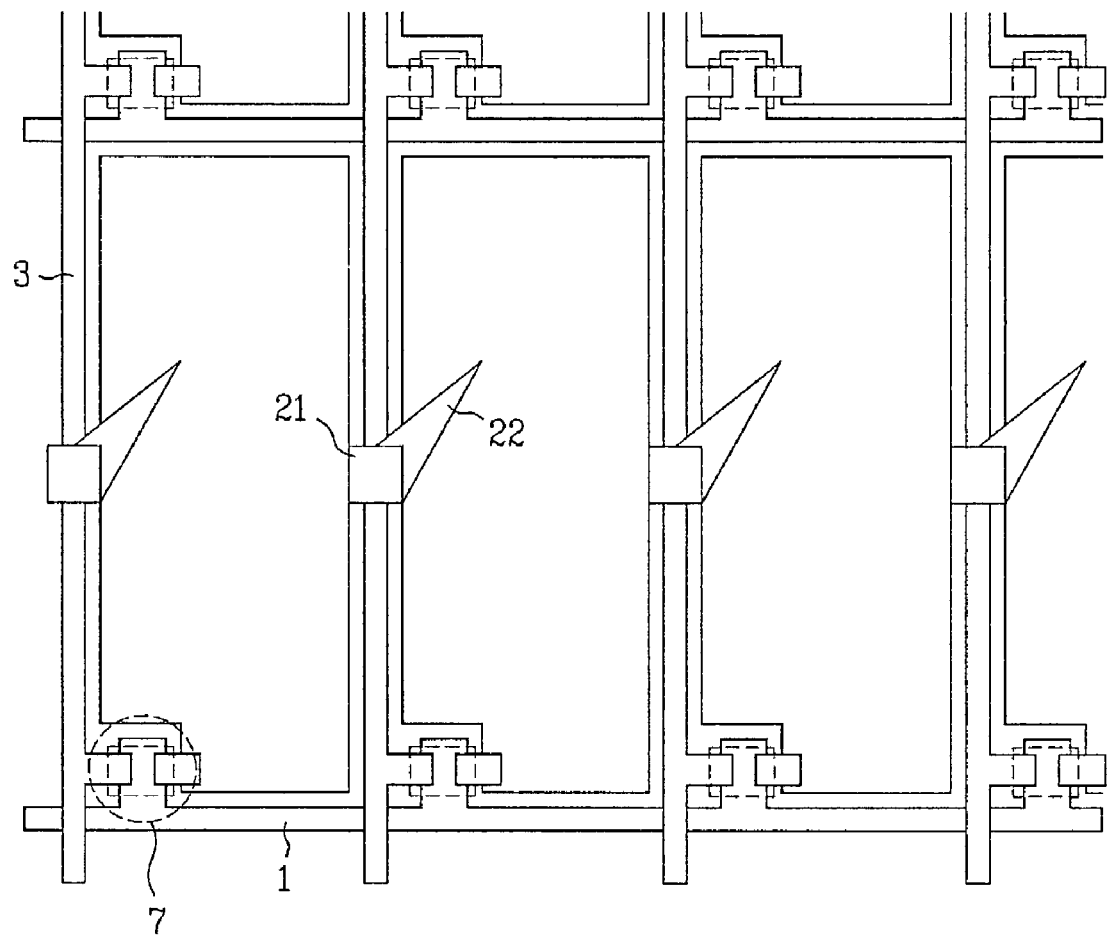
FIG. 6 illustrates a layout of a multi-domain liquid crystal display on which a rubbing step according to a second embodiment of the present invention is carried out.
Figure 7:
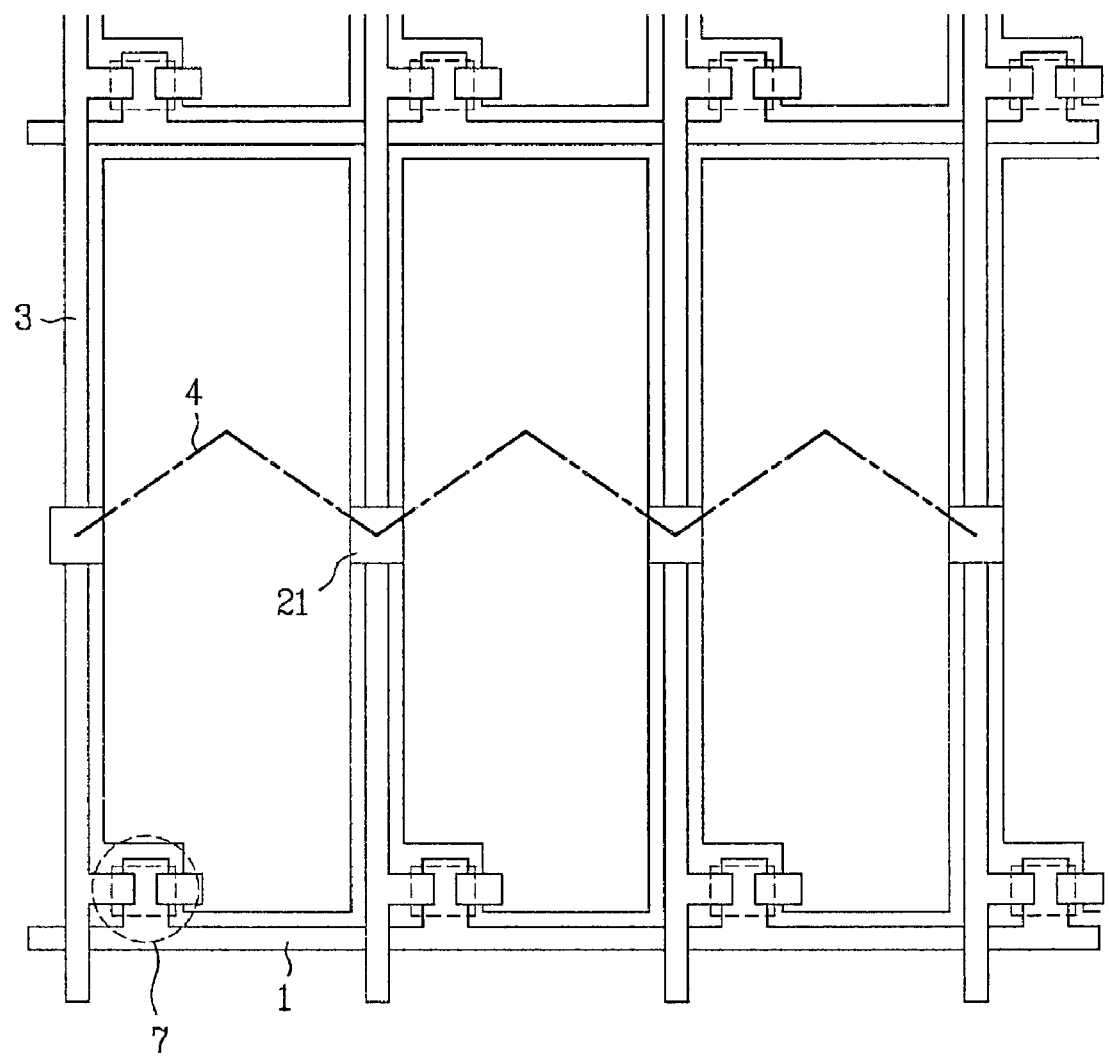
FIG. 7 illustrates a layout of a multi-domain liquid crystal display according to a second embodiment of the present invention.

FIG. 6 illustrates a layout of a multi-domain liquid crystal display on which a rubbing step according to a second embodiment of the present invention is carried out, and FIG. 7 illustrates a layout of a multi-domain liquid crystal display according to a second embodiment of the present invention.

Namely, a rubbing failure area 22 generated from 45° alignment is shown in FIG. 6. Such a failure can be cured by a couple of the following solutions.

First, when the rubbing is carried out in a direction perpendicular or horizontal to the data line 3, the data line 3 is covered with the black matrix layer 14 of the second substrate 10. Thus, even if the ribbing brings about the mark of the patterned spacer 21, the patterned spacer 21 exists on the data line 46 or alignment boundary. Therefore, the poor image quality caused by the rubbing mark can be prevented previously.

Second, when the rubbing direction is 45° or 135°, the alignment boundary 4 of the alignment layers 17a and 17b, as shown in FIG. 7, is almost formed to face the same direction of the rubbing. In this case, the boundary 5 between two domains of the alignment layer 17a or 17b is not straight but bent. Moreover, the black matrix layer 14a of the second substrate is formed bent in order to shield the bent domain boundary, thereby enabling to overcome the above failure.

Accordingly, the multi-domain liquid crystal display according to the present invention has the following advantages or effects.

The present invention enables to arrange the patterned spacers at the demanded locations regularly and improve an opening ratio using the patterned spacers. Moreover, if the patterned spacer is placed so as to coincide with the alignment boundary, the alignment direction directed by the director of liquid crystal molecules or the pretilt angle direction becomes fixed so as to secure the alignment safety of liquid crystals as well as make the domain boundary coincide with the alignment boundary.

Therefore, the domain boundary coincides with the alignment boundary by forming the patterned spacer at the alignment boundary instead of the scattered spacer of the related art, thereby enabling to reduce the width of the black matrix shielding the alignment boundary. Resultingly, the opening ratio is increased as well as the domain boundary coincides with the alignment boundary, thereby enabling to overcome the problem of the twisted liquid crystals to increase a contrast ratio of liquid crystals. Moreover, the alignment boundary is changed in accordance with the rubbing direction so as to overcome the problems occurring in rubbing due to the patterned spacer.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A multi-domain liquid crystal display, comprising:
  a first substrate having a plurality of pixel areas defined by a plurality of data and gate lines and a plurality of pixel electrodes formed in the pixel areas, respectively;
  a second substrate having a black matrix layer blocking off light from an alignment boundary in each of the pixel areas, and a color filter layer realizing colors;
  a common electrode formed on the color filter layer;
  a first alignment layer formed on one of the first or second substrates so as to have at least two different alignment states centering around the alignment boundary;
  a plurality of patterned spacers formed between the first and second substrates, wherein each patterned spacer is formed outside each pixel area and is aligned with each alignment boundary and wherein each patterned spacer is formed on the common electrode; and
  wherein the each alignment boundary in the each pixel area is determined according to a position of the each patterned spacer and a rubbing direction of the first alignment layer.

2. The multi-domain liquid crystal display of claim 1, further comprising a second alignment layer formed on the other of the first or second substrates.

3. The multi-domain liquid crystal display of claim 2, wherein the second alignment layer has a mono-domain.

4. The multi-domain liquid crystal display of claim 2, wherein the second alignment layer has at least two different alignment states centering around the alignment boundary.

5. The multi-domain liquid crystal display of claim 2, wherein the first and second alignment layers are aligned in directions vertical to each other and the second alignment layer is aligned in a direction parallel with the data lines.

6. The multi-domain liquid crystal display of claim 2, wherein the first and second alignment layers are aligned in directions vertical to each other and the second alignment layer is aligned in a direction inclining to the gate lines at 45°.

7. The multi-domain liquid crystal display of claim 2, wherein the first and second alignment layers are exposed to UV-rays selectively so as to have a plurality of pretilt angles in each of the pixel areas.

8. The multi-domain liquid crystal display of claim 1, wherein the patterned spacer is formed on an intersection between the alignment boundary and data line.

9. The multi-domain liquid crystal display of claim 1, wherein the patterned spacer is formed on the black matrix layer of the second substrate corresponding to an intersection between the alignment boundary and data line.

10. The multi-domain liquid crystal display of claim 1, wherein the patterned spacer is formed of an insulator selected from a group consisting of PR (photoresist), BCB (benzocyclobutene), and $SiN_x$.

11. The multi-domain liquid crystal display of claim 1, wherein each patterned spacer is formed in correspondence with an intersection between the alignment boundary and data line.

12. The multi-domain liquid crystal display of claim 1, wherein the alignment boundary traverses centers of the respective pixel areas so as to be in parallel with the gate lines.

13. The multi-domain liquid crystal display of claim 1, wherein the alignment boundary is bent at a center of each of the pixel areas.

14. The multi-domain liquid crystal display of claim 1, wherein the patterned spacer contacts the first and second substrates and maintains a cell gap between the first and second substrates.

15. A multi-domain liquid crystal display comprising:
- a first substrate having a plurality of pixel areas defined by a plurality of data and gate lines and a plurality of pixel electrodes formed in the pixel areas, respectively;
- a second substrate having a black matrix layer cutting off lights outside the pixel areas and a color filter layer realizing colors;
- a common electrode formed on the color filter layer;
- a liquid crystal layer formed between the first and second substrates so as to have at least one alignment boundary in each of the pixel areas, the black matrix layer also cutting off light from the alignment boundary; and
- a plurality of patterned spacers formed between the first and second substrates, wherein each patterned spacer is formed outside each pixel area and is aligned with each alignment boundary and wherein each patterned spacer is formed on the common electrode; and
- an alignment layer formed on at least one of the first or second substrates so that the liquid crystal layer has the alignment boundary;
- wherein the each alignment boundary in the each pixel area is determined according to a position of the each patterned spacer and a rubbing direction of the alignment layer.

16. The multi-domain liquid crystal display of claim 15, wherein the patterned spacer is formed on an intersection between the alignment boundary and data line.

17. The multi-domain liquid crystal display of claim 15, wherein the patterned spacer is formed on the black matrix layer of the second substrate corresponding to an intersection between the alignment boundary and data line.

18. The multi-domain liquid crystal display of claim 15, wherein the patterned spacer is formed of an insulator selected from a group consisting of PR (photoresist), BCB (benzocyclobutene), and $SiN_x$.

19. The multi-domain liquid crystal display of claim 15, wherein the alignment boundary traverses centers of the respective pixel areas so as to be in parallel with the gate lines.

20. The multi-domain liquid crystal display of claim 15, wherein the alignment boundary is bent at a center of each of the pixel areas.

21. The multi-domain liquid crystal display of claim 15, wherein the patterned spacer contacts the first and second substrates and maintains a cell gap between the first and second substrates.

* * * * *